United States Patent

Nomura et al.

[11] 3,876,860
[45] Apr. 8, 1975

[54] TAPE HEATER

[75] Inventors: Noboru Nomura, Kyoto; Mitsuaki Ono, Katano; Masahiko Yatsugake, Kyoto; Yukihiro Fukushima, Neyagawa, all of Japan

[73] Assignee: Matsushita Electric Industrial Co., Ltd., Osaka, Japan

[22] Filed: Mar. 20, 1974

[21] Appl. No.: 453,052

[30] Foreign Application Priority Data

Mar. 23, 1973 Japan................................ 48-33802
May 22, 1973 Japan................................ 48-58015
Apr. 20, 1973 Japan................................ 48-48038
Dec. 5, 1973 Japan.............................. 48-140760

[52] U.S. Cl. ................ 219/388; 219/470; 219/494; 219/530; 226/25; 346/74 M; 360/16; 360/59
[51] Int. Cl. ............................................ F27b 9/06
[58] Field of Search .......... 219/494, 510, 388, 469, 219/470, 530, 471, 540; 34/110, 114; 242/55; 226/25; 346/74 M; 360/16, 59

[56] References Cited
UNITED STATES PATENTS

| | | | |
|---|---|---|---|
| 2,915,594 | 12/1954 | Burns, Jr. et al. | 360/59 |
| 2,993,260 | 7/1961 | Boerma et al. | 219/388 X |
| 3,254,852 | 6/1966 | Herrick et al. | 242/55 |
| 3,465,105 | 9/1969 | Kumada | 360/16 |
| 3,561,133 | 2/1971 | Hauck | 219/388 X |
| 3,632,898 | 1/1972 | Slade et al. | 360/16 |
| 3,699,267 | 10/1972 | Hoell | 360/16 |
| 3,699,269 | 10/1972 | Smaller | 360/16 |
| 3,700,855 | 10/1972 | Helms et al. | 219/388 |
| 3,703,612 | 11/1972 | Higashida | 360/16 |
| 3,825,725 | 7/1974 | Leitner et al. | 219/530 |

*Primary Examiner*—Volodymyr Y. Mayewsky
*Attorney, Agent, or Firm*—Stevens, Davis, Miller & Mosher

[57] ABSTRACT

A tape heater for magnetic tape duplicators based on the thermoremanent method comprises a heater body having a heating surface to be touched by a travelling magnetic tape to be heated and a plurality of heat generating means thermally coupled to the heater body. At least one of said heat generating means is controlled according to a different power-temperature characteristic with respect to the other heat generating means in response to the output of temperature detecting means detecting the temperature of the heater body.

10 Claims, 22 Drawing Figures

TAPE HEATER

This invention relates to tape heaters for heating moving tape-like matter to a constant temperature. More particularly, the invention concerns the tape heater for heating the slave tape in thermoremanent duplication.

The processes of duplicating magnetic tapes include a head-to-head process, in which signals recorded on a master tape are reproduced through a magnetic head and recorded again through another magnetic head on a slave tape, an anhysteretic contact process, in which the magnetic surface of a master tape bearing signals recorded thereon and the magnetic surface of a slave tape having a coercive force smaller than that of the master tape are brought into close contact with each other to apply a transfer field upon the slave tape, thereby copying the recorded signals onto the slave tape, and thirdly a thermoremanent process, in which a slave tape heated to the vicinity of its Curie point is cooled with its magnetic surface held in contact with the signal bearing magnetic surface of a master tape, thereby copying the master tape signal onto the slave tape.

In the head-to-head duplication, the quality of duplication is subject to fluctuations due to wear of the magnetic heads and fluctuations of the characteristics of the associated electronic circuits. Particularly, in the duplcation of VTR tapes by using a rotary head assembly, it is difficult to increase the tape speed at the time of duplication beyond the tape speed at the time of playback. With this limitation, high speed duplication cannot be obtained. In case of the anhysteretic contact duplication, which is a contact duplication process, high speed duplication is possible irrespective of the magnetization pattern on the magnetic tape. However, the duplication efficiency is not enough to obtain duplicated tapes of sufficiently high quality.

The thermoremanet duplication process, which is also a contact duplication process, enables high speed duplication. Also, in this case the duplication efficiency is far superior to that of the anhysteretic contact process. Thus, this process is very superior among the various duplication processes. However, since the slave tape is heated to the vicinity of its Curie point, it is prone to thermal deformation. This problem must be solved in order to employ this process in practice.

The following description will proceed in conjunction with the accompanying drawings, in which.

Figure 1:
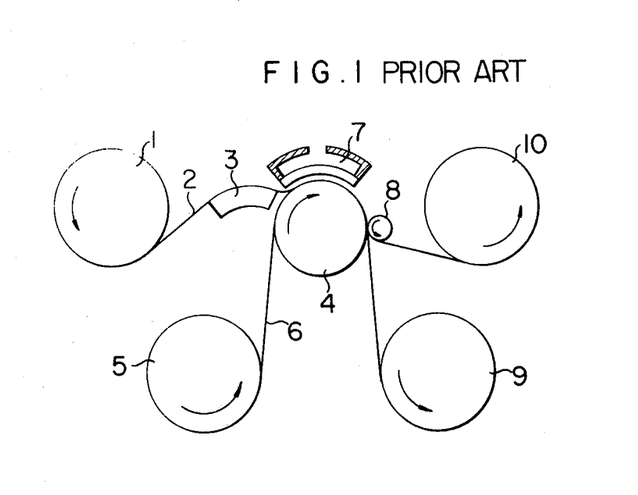
FIG. 1 is a schematic representation of a magnetic tape duplicator based on the thermoremanent process.

FIG. 1 shows a magnetic tape duplicator based on the thermoremanent contact process. Here, a slave tape 2 supplied from a slave tape reel 1 is heated by a tape heater 3 to the vicinity of its Curie point, and it is then brought into contact with a master tape 6 supplied from a master tape supply reel 5 on the periphery of a capstan 4 by means of a pneumatic unit 7. The pneumatic unit 7 issues high pressure gas from its face facing the capstan 4, so that the master tape and slave tape are forced against the capstan in contact with each other by the jet of the pressurized gas. The capstan 4 also has the function of cooling the master tape and slave tape with a cooling medium such as water circulated within it. When the slave tape 2 is cooled on the periphery of the capstan 4 with its magnetic surface held in forced contact with the magnetic surface of the master tape, the signals recorded on the master tape are copied onto the slave tape. The slave tape 2 and master tape 6 are driven by the capstan 4 and pinch roller 8 and are taken up on respective takeup reels 9 and 10.

Figure 2:
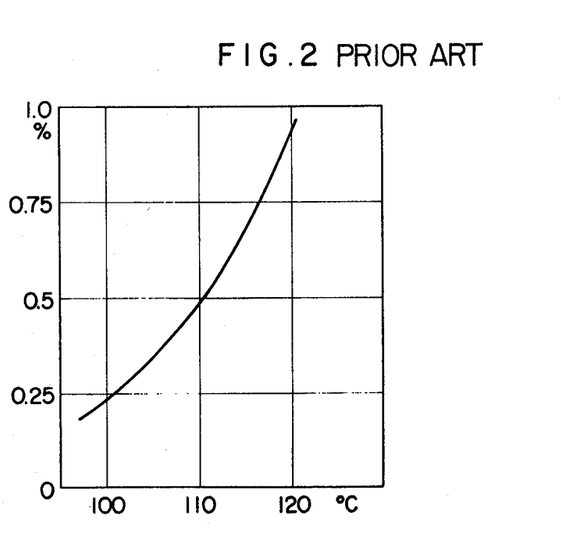
FIG. 2 is a graph showing the thermal deformation of an example of the magnetic tape using polyethylene naphthalate.

In the employment of this magnetic tape duplicator based on the thermoremanent contact process, or more generally in the thermoremanent contact duplication, the slave tape is heated to the vicinity of the Curie point of its magnetic material. During its heating the slave tape is subject to deformation under the influence of the temperature and the tension applied at heating. This results from the fact that the glass transition point of the plastics used for the base of the slave tape is lower than the Curie point of its magnetic material. FIG. 2 shows results of measurements of thermal deformation of a magnetic tape using a polyethylene naphthalate base. Here, the glass transition point of the polyethylene naphthalate is 60° to 110°C, and the slave tape undergoes deformation before the reaching of the Curie point of the magnetic material, for instance for $CrO_2$ the Curie point being about 130°C. Particularly, it will be seen that the thermal deformation of the slave tape greatly depends upon the heating temperature. In other words, it will be seen that the stability of the heating temperature of the slave tape and response to the change of heat generation at the heat source with regard to the presence or absence of the slave tape moving in contact with the tape heater have influence upon the transversal and longitudinal distortions of the slave tape. If the temperature stability and response are unsatisfactory, the reproduction of the video signal copied on the slave tape leads to skew on the picture reproduction. Thus, it will be understood that in the thermoremanent contact duplication the performance of the tape heater for heating the slave tape is very important.

The present invention, accordingly, has an object of providing a tape heater for thermoremanent contact type high-speed magnetic tape duplicators, which can preclude the drawbacks inherent in the duplicators of this type and permits to production of duplication tapes of high quality with less thermal deformation.

Another object of the invention is to provide a tape heater for thermoremanent contact type magnetic tape duplicators, which has a construction suited for effectively heating the slave tapes with tape widths within a particular range.

A further object of the invention is to provide a tape heater, the temperature of which can be quickly elevated to a predetermined working temperature at the time of starting the magnetic tape duplicator and steadily held at that temperature during the operation of the duplicator, and in which the working temperature is hard to fluctuate due to quick response of temperature control means to external disturbances such as reaching of a moving slave tape to it and sudden changes of the ambient temperature.

Figures 3A, 3B:
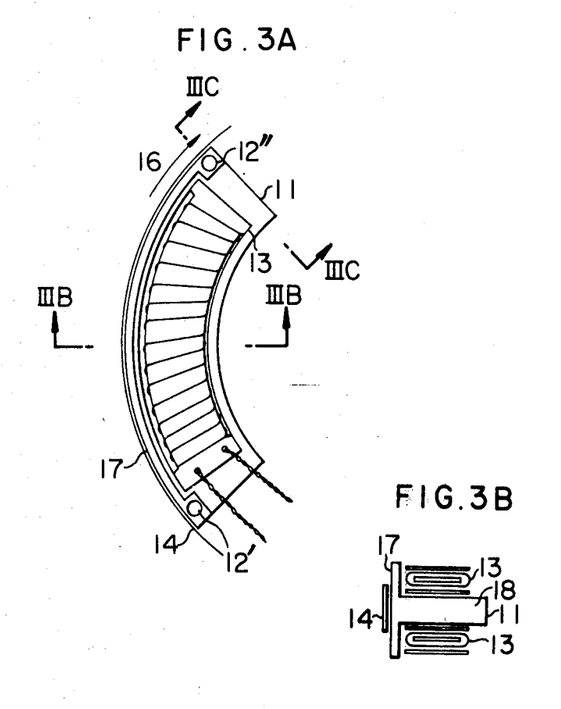
FIGS. 3A, 3B and 3C show, in plan view in FIG. 3A and in transversal sections in FIGS. 3B and 3C, an embodiment of the tape heater according to the invention.
Figure 3C:
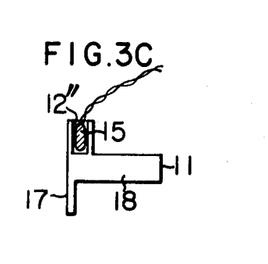

FIGS. 3A to 3C show an embodiment of the tape heater according to the invention. It has a heater body 11 made of a material of good thermal conductivity and having an arcuate heating surface 17 for heating a magnetic tape 14 in contact therewith. The magnetic tape 14 is driven in the direction of arrow in FIG. 3A. The heating surface 17 is sufficiently polished or plated with chromium or the like to extend the service life. Numeral 13 designates heat generating means, which may consist of nichrome wire and an insulator. The quantity of heat generated in the heat generating means 13 is controlled by temperature sensors 15. In the instant embodiment, two heat generating means 13 are provided adjacent an extension 18 of the heater body 11 extending on the back side opposite the heating surface 17, and they are pressure fitted to the opposite sides of the extension 18, as shown in FIG. 3B. The temperature sensors 15 are fitted in respective bores 12' and 12'' provided in the heater body 11, as shown in FIG. 3C, and they detect the temperature of the heater body in the vicinity of the heating surface 17 in contact with the magnetic tape 14.

Figure 4:
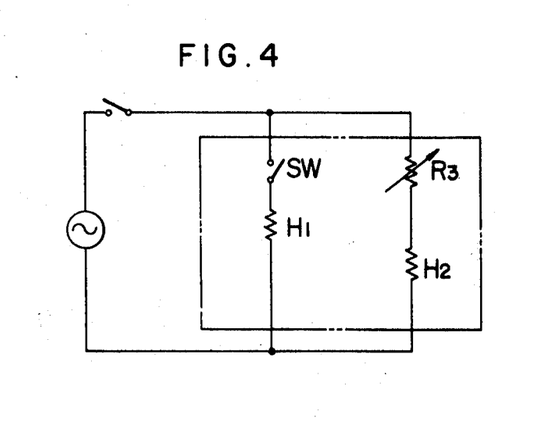
FIG. 4 is a circuit diagram showing an equivalent circuit of the tape heater according to the invention.

FIG. 4 shows an equivalent electric circuit of the tape heater. As is shown, the heat generating means, indicated at $H_1$ and $H_2$ respectively, are connected respectively in series with a variable resistor element $R_3$ and a switch SW, these elements being controlled by the respective temperature sensors 15, which are fitted in the respective bores 12' and 12'' provided in the heater body at positions near incoming and outgoing ends with respect to the direction of travel of the magnetic tape 14 and detect the temperature in the vicinity of their locations. The variable resistor element $R_3$ and switching element SW may be realized with a parallel connection of two phase controlled temperature regulators such as one using a triac as shown in FIG. 5.

Figure 5:
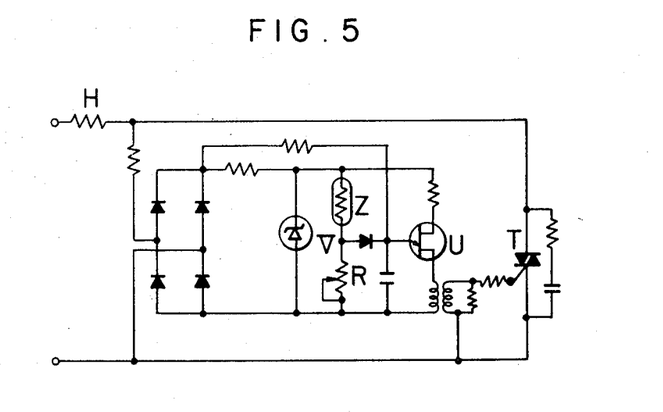
FIG. 5 is a circuit diagram showing a circuit for realizing a variable resistor element and a switching element in the circuit of FIG. 4.

In the circuit of FIG. 5, a triac T supplies a-c full wave phase controlled power to a heat generator H. Here, the conduction angle of the triac is controlled through the control of pulse current flowing in a unijunction transistor U by a pedestal voltage V determined by the voltage division ratio between a temperature sensor Z of a suddenly or sharply changing resistance type and a resistor R, thereby controlling the power supplied to the heat generator H. Thus, with this circuit the quantity of heat generated by the heat generator H can be varied by varying the resistance of the temperature sensor Z and that of the resistor R.

Figure 6:
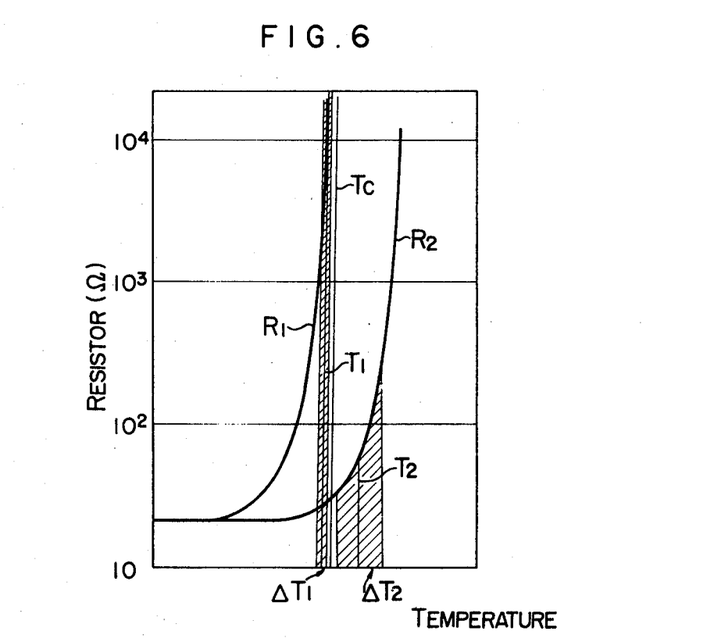
FIG. 6 is a graph showing resistance-temperature characteristics of temperature sensors of sharply changing resistance type used for constructing the variable resistance element and switching element.

As the temperature sensor of suddenly or sharply changing resistance type for one of the aforementioned temperature regulators is used a temperature sensor $z_1$ having a resistance versus temperature characteristic represented by curve $R_1$ in FIG. 6, and for the other temperature regulator is used a second temperature sensor $z_2$ having a characteristic represented by curve $R_2$. In the former temperature regulator the resistance of the resistor R is set to a large value to set the working temperature $T_1$ such that the range of the conduction angle of the triac variable according to the division voltage corresponds to a temperature range $\Delta T_1$ corresponding to a sharp slope portion of the characteristic of the sharply changing resistance type temperature sensor. In this case, while the heat generated by the heat generating means is transferred to the temperature sensor through the heater body 11 of the heater, the resistance $R_1$ of the temperature sensor sharply changes with a temperature change in the heater body 11 to cause a sharp change of the triac conduction angle, so that the thermal equiliblium state of the heater cannot be provided within the temperature range $\Delta T_1$. This is equivalent in effect to intermittently passing current through the heat generator according to slight changes in temperature, and this function is provided by the switch SW shown in FIG. 4.

To realize a variable resistor element, the sharply changing resistance type temperature sensor $z_2$ is inserted instead of the sharply changing resistance type temperature sensor $z_1$ in the circuit of the switching element, and the resistor R is set to a small value to set the working temperature $T_2$ such that the range of the conduction angle of the triac is variable according to the division voltage corresponds to a temperature range $T_2$ higher than $T_1$ and corresponding to a gentle slope portion of the characteristic of the sharply changing resistance type temperature sensor $z_2$. While in this case the heat generated by the heat generating means is also transferred to the temperature sensor $z_2$ through the heater body 11 of the heater, the resistance $R_2$ of the temperature sensor gently changes with a temperature change in the heater body 11 to cause a gentle change of the triac conduction angle, so that the thermal equilibrium state of the heater can be provided within the temperature range $\Delta T_2$. Here, the average voltage supplied to the heat generator is equivalent to that which results with the series circuit of heat generating means $H_2$ and variable resistor $R_3$ shown in FIG. 4.

As has been shown, the tape heater essentially comprises heater body 11, heat generating means 13 and temperature sensors 15, with the heat generating means 13 and temperature sensors 15 being combined to form the afore-mentioned circuits.

The operation of the tape heater of the above construction will now be discussed.

Considering now a tape heater using a single heat generating means and a single temperature sensor for controlling the current supplied to the heat generating means, a large heat generating means must be used in order to be able to quickly elevate the temperature of the tape heater from normal temperature to a predetermined working temperature at the time of starting the magnetic tape duplicator. At this time, the temperature of the tape heater is controlled to a temperature $T_2$ higher than the Curie point $T_c$. With a large heat generating means, however, the on-off control of the current supplied thereto is prone to great overshoots of the tape heater surface temperature due to such causes as the heat capacity of the heater body 11 and time required for the heat transfer. With such great overshoots the uniform heating of the slave tape is difficult. If a smaller heat generating means is used to reduce the overshoots of the tape heater surface temperature, the time $t_1$ until a predetermined working temperature of the tape heater is reached is increased. Besides, with only a single temperature sensor it is possible to detect the temperature of only a very narrow portion of the tape heater surface, and hence it is impossible to promptly respond to temperature changes occurring in portions somewhat distant from the temperature sensor.

The tape heater according to the invention uses a plurality of heat generating means, two heat generating means in the above embodiment, and temperature sensors individually controlling the respective heat generating means.

In case of using two temperature sensors of the type having a sharp resistance-temperature characteristic slope as in the above embodiment, a predetermined temperature $T_2$ of the first one of the temperature sensors for a point on a sharp slope portion of the characteristic is set to be higher than the Curie point $T_c$, while that of the other temperature sensor is set to $T_1$ lower than the Curie point. While the actually required temperature of the magnetic tape is $T_c$, the equilibrium temperature of the heater has to be slightly higher than $T_c$ because of compensation for reduction of the temperature at the tape heater surface due to contact therewtih of the moving magnetic tape and temperature changes of the tape heater due to external disturbances.

Further, in the thermoremanent duplicator as shown in FIG. 1, since the pressure contact point of the master tape is not on the tape heater 3 but on an outer periphery of the capstan 4, the heated slave tape is somewhat cooled after it has left the tape heater and before it reaches the pressure contact point. On the other hand, since it is actually required that the temperature of the slave tape at the pressure contact point be kept near the Curie point of the slave tape, the thermal equilibrium temperature of the tape heater must be set at a temperature of $T_{c'}$, which is higher than the Curie point $T_c$ of the slave tape. In such a case, the control temperatures of the temperature sensors $T_1$, $T_2$ are required to be set above and below the temperature $T_{c'}$, which is higher than the Curie point $T_c$ of the slave tape.

With the above arrangement, from the closure of a switch to start the heating of the heater body from room temperature the temperature of the heating surface sharply rises with current caused to flow into the heat generating means until it reaches $T_1$. By appropriately supplying power to the heat generating means and appropriately selecting the temperature sensors the temperature may rise with time according to curve $H_1 + H_2$ shown in FIG. 7. If this is done, the time $t_2$ required till the temperature $T_2$ is reached may be made very short compared to time $t_1$, $t_1$ being the time required for the temperature to rise to $T_2$ along the curve $H_2$ when a single heat generating means is used.

As the tape heater temperature reaches the neighborhood of $T_1$, the resistance $R_1$ of the first temperature sensor is sharply increased to sharply increase the resistance of the afore-mentioned switching element controlled by the temperature sensor. Since this sharply increased resistance is added to the resistance of the heat generating means, the current flowing therethrough is reduced. Thus, this heat generating means ceases to generate heat when the neighborhood of temperature $T_1$ is reached. As a consequence, the rate of temperature rise of the tape heater according to curve $H_1 + H_2$ in FIG. 7, which is sharp up to the neighborhood of temperature $T_1$, is reduced, with the tape heater temperature now rising at a rate of temperature rise solely due to the other heat generating means. With subsequent reaching of temperature $T_2$, this time the resistance $R_2$ of the second temperature sensor increases, and the increased resistance of the variable resistor element is added to the resistance of the second heat generating means to reduce heat generated therein. In this way, the tape heater is eventually brought to an equilibrium temperature state in the neighborhood of $T_2$. In the presence of a magnetic tape moving in contact with the tape heater, the temperature of the heating surface of the tape heater is slightly reduced from the aforementioned equilibrium point toward $T_c$. However, by a suitable setting such that the second heat generating means generates an appropriate quantity of heat the temperature of the heating surface in contact with the moving tape may be held at an equilibrium point between $T_1$ and $T_2$.

With the above tape heater according to the invention, unlike the case using only a single heat generating means and a single temperature sensor, the heat generating means may be of comparatively small capacity, so that it is possible to reduce overshoots of the temperature of the heating surface of the tape heater at the time of on-off controlling the current to the heat generating means. Also, response to changes of the tape heater temperature due to external disturbances, such as a change of rate of natural cooling of the tape heated caused with a sudden change of ambient temperature or fluctuations of the source voltage, can be improved since the first heat generating means beings to generate heat with temperature fall below $T_c$ while the second heat generating means ceases heat generation when the temperature exceeds $T_2$.

While the above embodiment has used two heat generating means and two temperature sensors, more effective temperature control can be realized by using more than two heat generating means and temperature sensors for controlling current in the respective heat generating means, with the control temperatures thereof set at finer intervals between temperature $T_2$ higher than the Curie temperature $T_c$ of the slave tape and $T_1$ lower than the Curie temperature. Also, while in the above case the control temperatures are set above and below $T_c$, it is possible to set control temperatures all above $T_c$.

Meanwhile, the temperature control of the tape heater is greatly influenced by the relative positions of the heater body 11 constituting the heat transfer path from the heat generating means 13, heating surface 17 and temperature sensors 15. While the heat generated in the heat generating means 13 is transferred through the heat transfer path toward the heating surface in contact with the tape, temperature distribution along the heat transfer path varies depending upon the shape of the heater body and the state of contact between the tape and heater body, and the control of the heat generation and exact temperature of the tape heating area is influenced by the position of the temperature sensors relative to the heater body.

Figure 8:
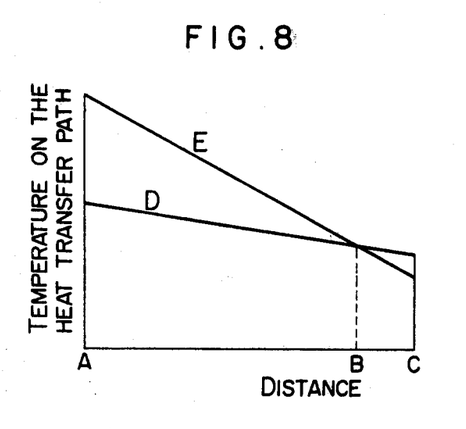
FIG. 8 is a pictorial view showing an example of temperature distribution over the heat transfer path from heat generator to temperature sensor.

FIG. 8 shows examples of temperature distribution along the heat transfer path from heat generating means 13 to temperature sensors 15. In the Figure, A represents the position of the surface of the heater body 11 in contact with the heat generating means 13, B the position of the heating surface in contact with the magnetic tape, and C the position of the temperature sensors. In the absence of the magnetic tape moving in contact with the heating surface 17 of the heater body, less heat is removed from the heat transfer path and, hence, less heat need be supplied. In this case, the temperature at the heat source is low and the temperature gradient across the heat transfer path is small so that the temperature distribution therealong is substantially uniform, as shown at D. In the presence of a magnetic tape moving in contact with the heating surface 17, much heat is removed from the heater body 11. In this case, the temperature at the heat source is higher to make up for the greater heat removed, and also the temperature gradient across the heat transfer path is greater, as shown at E. Thus, there is always an intersection B between the two temperature versus distance curves D and E, and by selecting the position of the heating surface in contact with the tape in the proximity of the intersection point B it is possible to maintain the tape heater temperature substantially constant irrespective of whether the heating surface is in contact with a moving tape or not, that is, the tape can be heated at a constant temperature. Also, by providing temperature sensors at position C temperature changes at point B, at which heat is lost, can be transmitted in an amplified form to the temperature sensors, so that the temperature at point B can be controlled more accurately.

This status of the tape heater can be realized, for instance, with the construction of FIG. 3. As mentioned earlier, the construction of FIG. 3 comprises heater body 11 having heater surface 17 for heating a tape in sliding contact therewith, bores 12' and 12'' formed near opposite ends of the heating surface 17 for receiving respective temperature sensors and an extension backwardly extending in a direction substantially normal to the heating surface, with the heat generating means mounted on the extension in contact therewith. With this construction, the heat generated at the heat generating means 13 is transferred to the heater body 11 and flows through the extension 18 thereof extending in a direction substantially normal to the front heating surface 17 in contact with the magnetic tape. In view of this construction from the standpoint of the heat transfer path, the heating surface is located between the extension 18 in contact with the heat generating means 13 and the temperature sensors 15 in bores 12' and 12''.

In a further aspect, in the tape heater of this type the structure of the heater body is very important and appropriately selected depending upon the width of the magnetic tape to be heated.

Figure 9:
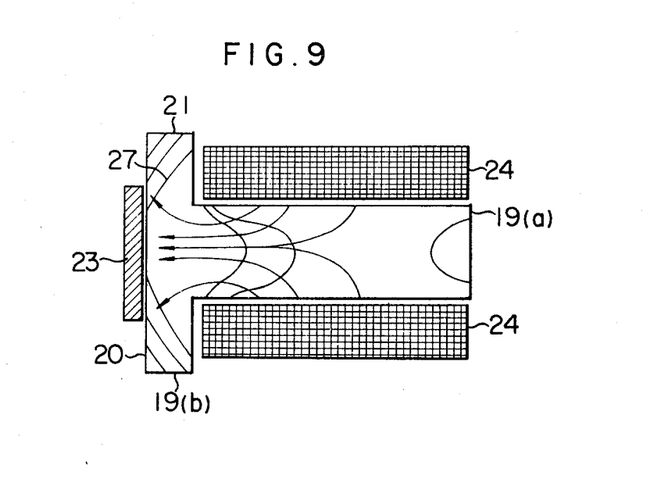
FIG. 9 is a sectional view showing an example of the tape heater according to the invention suited to heat narrow tapes.
Figure 10:
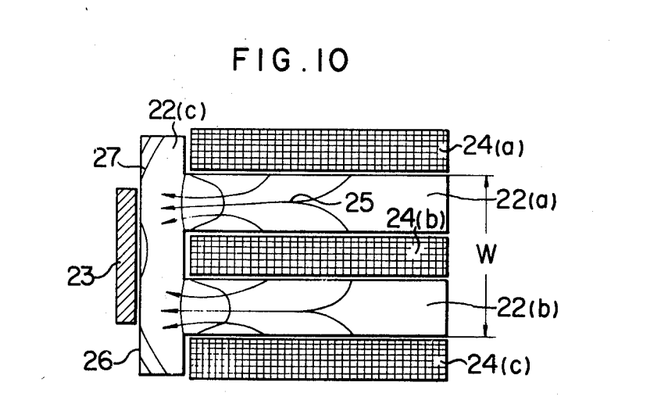
FIG. 10 is a sectional view showing a tape heater not suited to heat narrow tapes.

For heating magnetic tapes having small widths, namely less than one-half inch, a T-type tape heater as shown in FIG. 9 is suitably used. Prior to showing the merits of the T-type tape heater of FIG. 9, a channel-type tape heater as shown in FIG. 10 will be described. For narrow magnetic tapes such as a 3.8-mm cassette tape, the π-type or the channel-type tape heater of FIG. 10 using three heat generating means is not desired for reasons to be described. If the heat generating means 24b here is a nichrome wire heater, its thickness is at least about 1 to 2 millimeters. Then, a gap of about 2 millimeters for accommodating it is required between the two extensions 22a and 22b of the heater body. Also, the extensions 22a, 22b and a body 22c should each have a thickness of at least about 2 millimeters from the standpoint of mechanical strength. In consequence, the thickness dimension W in FIG. 10 is inevitably greater than the tape width. In such event, with heat flow indicated at 25 proceeding through the extensions 22a, 22b and a body 22c toward the front heating surface 26 the temperature at the front surface 26 tends to be lower toward the center of the magnetic tape 23 and higher toward the edges thereof as is seen from an isothermal line 27. With such temperature distribution over the heating surface, edge portions of the magnetic tape will be heated to particularly high temperature and become weaker compared to the rest of the tape. Where a positioning guide post or like means for guiding the heated magnetic tape 23 into contact with the master tape is provided in the vicinity of the contact point, the edge portions will be distorted to a greater extent than the rest of the tape by the guide post means. For maintaining the tape heater at the duplicating temperature and also for adequate temperature control, the other heat generating means 24a and 24c are also necessary, but their use will further promote the aforementioned tendency. Reducing the thickness of the extensions 22a, 22b and a body 22c, on the other hand, not only leads to sacrifice in mechanical strength but also makes the supply of required heat to the magnetic tape 23 more difficult. Accordingly, freedom from local intensive heating of the magnetic tape, ability to promptly supply heat and also simple construction are required for the tape heater for heating narrow magnetic tapes.

These requirements can be met with the T-type tape heater construction of FIG. 9. With this construction, the thickness of the extension 19a in contact with the heat generating means 24 may be made substantially equal to or smaller than the tape width. In this case, less heat can be supplied to edge portions of the tape 23 than the heat supplied to the central portion, so that overheating of edge portions of the tape can be eliminated. Also, since the extension 19a of the heater body may have a thickness substantially equal to the tape width, enough heat can be supplied to sufficiently heat the magnetic tape. The tape heater of FIG. 9 has a small heat capacity and short heat transfer path compared to the channel-type tape heater of FIG. 10, so that it provides better response and permits heating the magnetic tape uniformly. Also, since two heat generating means can be provided, a sufficient supply of heat can be ensured.

Figure 11:
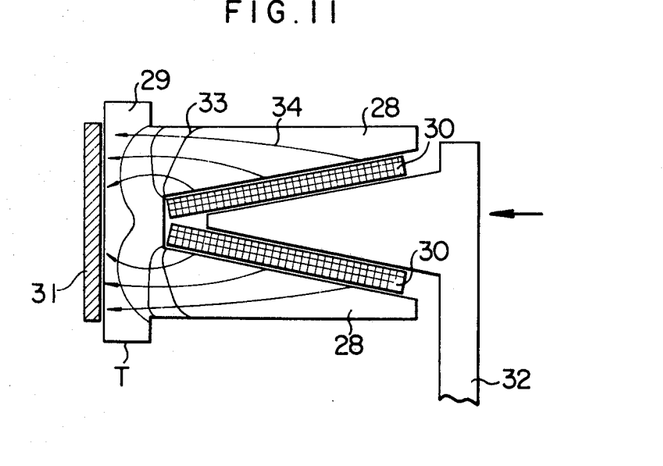
FIG. 11 is a sectional view showing another example of the tape heater according to the invention suited to heat wide tapes.

For heating magnetic tapes with tape widths in excess of one-half inch, the basic tape heater construction comprises a heater body having a heating surface in sliding contact with the tape and a plurality of extensions in contact with heat generating means such as shown in FIG. 10 as a basic form. FIG. 11 shows an example of the channel-type tape heater for heating a magnetic tape with a width of about one-half inch. In this construction, heat generating means 30 are provided on the inner sides of rear extensions 28 of the heater body. Here again if the heat generating means 30 are nichrome wire heaters, their thickness is at least 1 to 2 millimeters. Here two heating means are provided within the gap 35 between the two extensions, so that the gap has to have a thickness dimension of at least about 4 millimeters. Also, to provide sufficient heat flow for uniformly heating the magnetic tape 31, each extension 28 of the heater body must have a thckness of at least 1 millimeter. Accordingly, the construction of FIG. 11 is suited to heat magnetic tapes with widths in excess of 6 millimeters, or one-half inch practically. The heat generating means 30 are held in forced contact with the extensions 28 by a support 32 of a material having sufficient heat insulating property. With this construction of the tape heater, with the heat generating means 30 provided on the inner sides of the rear extensions 28 of the channel-shaped heater body and held in forced contact with the extensions by the support 32, the heat generated at the heat generating means 30 can be transferred to the heater body extensions 28 without direct radiation to the outside of the extensions. Also, by making the extensions 28 on their oblique side in contact with the heat generating means 30 such as to form a substantially V-shaped or frustconical sectional profile, the heat generating means 30 can be sufficiently urged against the oblique surfaces of the extensions 28 by forcing them in the direction of arrow with an extension of the support 32 having a complementary, substantially V-shaped sectional profile, whereby the heat transfer from the heat generating means to the extensions of the heater body can be improved. Further, by providing temperature sensors in the channel-shaped heater body 29 at positions indicated at T, the disposition of heat generating means, heating surface in contact with the tape and temperature sensors as mentioned in connection with FIG. 8 can be obtained, so that the temperature of the heating surface in contact with the magnetic tape can be accurately controlled.

Figure 12:
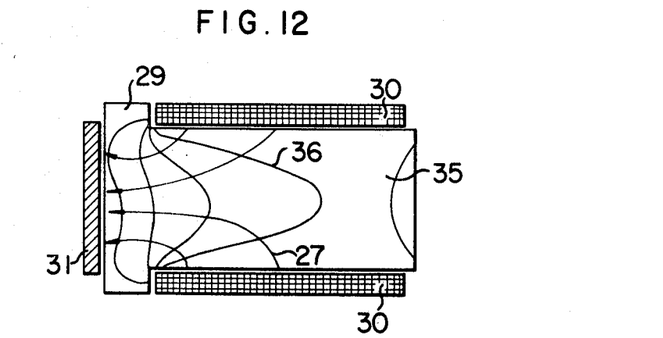
FIG. 12 is a sectional view showing a tape heater not suited to heat wide tapes.

The features of the channel-type tape heater for heating wide magnetic tapes will be more clearly demonstrated in comparison with a T-type tape heater shown in FIG. 12. To heat a one-half inch magnetic tape uniformly and with good response to a T-type tape heater, the thickness of the heater body extension serving as heat transfer path should be about one-half inch. More particularly, with the T-type tape heater of FIG. 12 the thickness of the extension 35 in contact with the heat generating means 30 is substantially the same as the width of the magnetic tape 31. As a consequence, the heat capacity is inevitably increased. In the channel-type heater body shown in FIG. 11, a groove is formed in a portion other than that which contributes to heat transfer in case of the structure of FIG. 12, with the heat generating means accommodated in the groove, so that the heat capacity is less. Also, the thickness of the extensions 28 in contact with the heat generating means 30 increases as one goes toward the magnetic tape, so that less resistance is offered to the flow of heat toward the magnetic tape.

The structure of the heater body is generally more complicated where the width of the tape to be heated is greater. In general, the number of heat generating means and heater body extensions in contact therewith are increased with increase in the width of the tape to be heated. Also, it may be generally said that if presently available heaters are to be used, the T-type tape heater construction is preferred for tapes no wider than four times the thickness of the heater, while the channel-type construction is preferred for tapes wider than four times the thickness dimension of the heater.

Figure 7:
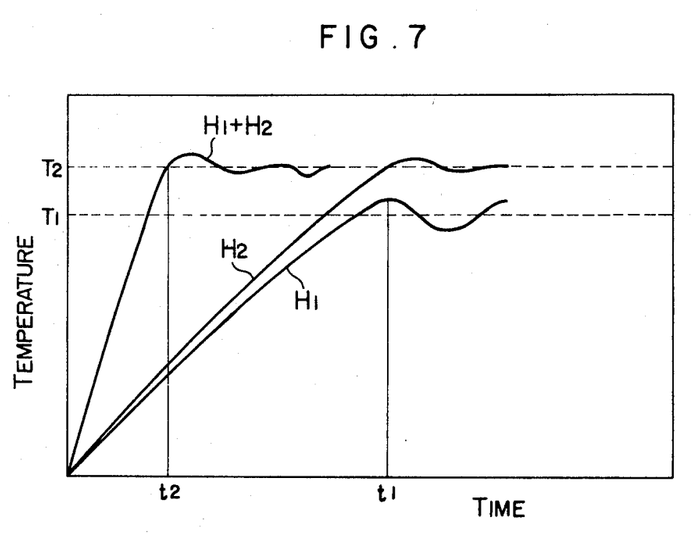
FIG. 7 is a graph showing temperature rise characteristics of some tape heaters.

As mentioned earlier, with the construction of FIG. 3 it may be so arranged that the temperature of the heating surface may rise from the starting of the magnetic tape duplicator according to curve $H_1 + H_2$ in FIG. 7, eventually settling to a predetermined temperature by the action of the temperature sensors. Assuming now that magnetic tape 14 is moving in contact with the heater body 11 in the direction of arrow 16, it is at room temperature when it is in the vicinity of the arrival end of the tape heater and is heated as it moves over the heating surface of the tape heater so that its temperature exceeds its Curie point when it is in the vicinity of the departure end of the tape heater. Over the heater body 11, the greater the rate of temperature rise of the magnetic tape the greater becomes the temperature difference between heater body 11 and magnetic tape 14. This means that the magnetic tape 14 is sharply heated in the vicinity of the arrival end of the heater body 11, that is, more heat is removed at the arrival end of the heater body 11 due to the contact between the heater body 11 and magnetic tape 14 than at the departure end of the heater body. Consequently, the temperature of the heater body 11 at the arrival end thereof is made lower than that at the departure end, that is, a temperature difference is produced between the arrival and departure ends of the heater body 11. Thus, the arrival end of the heater body 11 is more susceptible to temperature change due to contact of magnetic tape with the heater body.

Also, in the presence of a magnetic tape moving in contact with the heating surface, more heat must be supplied thereto than in the absence of tape moving in contact therewith since the magnetic tape absorbs heat. Otherwise, the temperature of the heater body will gradually fall until the heating of the tape to a temperature required for the duplication becomes impossible. In other words, heat must be replenished at least before the temperature of the departure end of the heater body 11 becomes lower than the temperature $T_c$, which is cooled to the Curie point at the magnetic tape at the contact point.

In light of the above, according to the invention at least two temperature sensors are provided, one at or near the arrival end of the heater body 11 and the other at or near the departure end of the heater body. With the temperature sensor provided at the arrival end a control circuit for on-off controlling current supplied to the heat generating means with respect to a certain temperature is formed, while with the temperature sensor provided at the departure end a control circuit for continually varying power supplied to the heat generating means in the neighborhood of a certain temperature is formed. With this construction, the temperature sensor provided on the arrival end side will quickly detect a change of temperature of the arrival end when the magnetic tape comes to touch the heater body and will accordingly control the supply of power to the heat generating means, while the temperature sensor provided on the departure end side will permit the control of the temperature of the departure end of the heater body to a substantially constant temperature.

Figure 13:
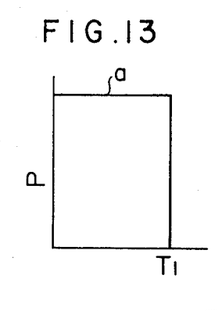
FIGS. 13 and 14 are views for illustrating the control of power supplied to heat generating means in the vicinity of threshold temperatures $T_1$ and $T_2$.
Figure 14:
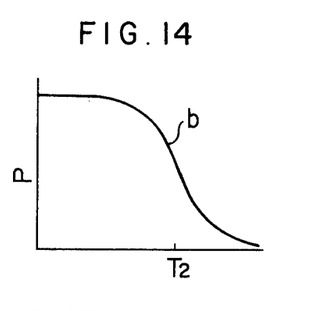

As an example of the above arrangement for the control of the temperature of the heater body 11, a temperature sensor with a characteristic $a$ shown in FIG. 13, i.e., capable of permitting power P to be supplied to the associated heat generating means for a temperature range below a threshold temperature $T_1$, is provided on the arrival side of the heater body, while a temperature sensor with a characteristic $b$ shown in FIG. 14, i.e., capable of permitting continually varying power P varying in the neighborhood of a temperature $T_2$ to the associated heat generating means, is provided on the departure side of the heater body.

With this arrangement, in the absence of magnetic tape moving in contact with the heating surface, after reaching of a constant temperature of the heater body the temperature sensor on the departure side functions to continually control the heat generated at the associated heat generating means according to the temperature of the heater body 11.

Also, when a magnetic tape comes to touch the heater body, extracting heat therefrom to cause a sharp decrease of the temperature of the arrival end of the heater body, the temperature sensor provided at the arrival end of the heater body 11 detects the sharp temperature fall and permits the associated heat generating means to generate a greater quantity of heat, thereby controlling the temperature of the heater body with good response. Meanwhile, the temperature sensor provided at the departure end regulates the temperature at that end, so that the magnetic tape can be steadily heated to a constant temperature.

Figure 15A:
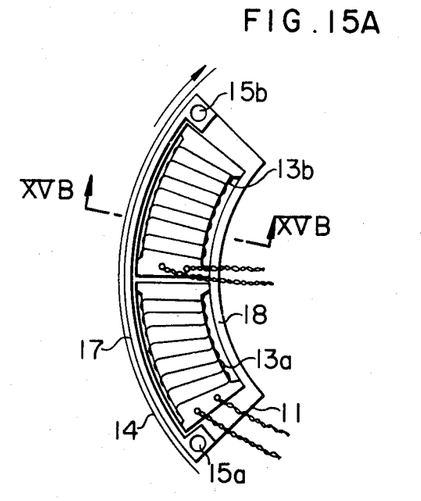
FIGS. 15A and 15B show, in plan view and transversal section, another embodiment of the invention.
Figure 15B:
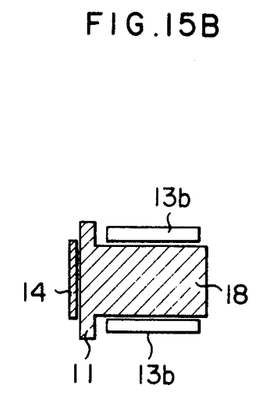

FIGS. 15 and 16 show other embodiments of the invention. In the embodiment of FIG. 15, each of the heat generating means 13 consists of two parts, namely first half 13a and second half 13b arranged one after another with respect to the direction of tape progress. These heat generating means halves 13a and 13b are arranged symmetrically on the upper and lower sides of the corresponding portion of the extension 18 of the heater body 11. The first heat generating means halves 13a are controlled to have a sharp power-temperature characteristic by a temperature sensor 15a ($R_1$ in FIG. 6) provided at the arrival end of the heater body 11, and the second heat generating means halves 13b are controlled to have a gentle power-temperature characteristic by a temperature sensor 15b ($R_2$ in FIG. 6) provided at the departure end of the heater body 11. With this construction, the temperature in the vicinity of the departure end of the heater body can be steadily controlled to a constant temperature.

Figure 16A:
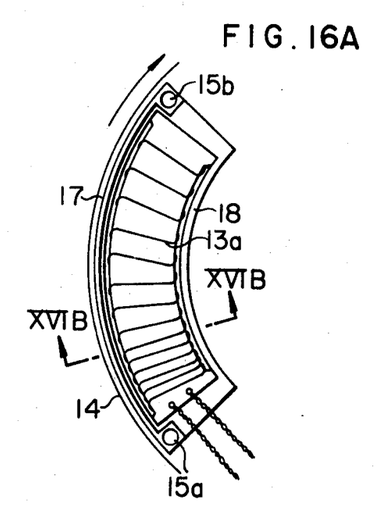
FIGS. 16A and 16B show, in plan view and transversal section, a further embodiment of the invention.
Figure 16B:
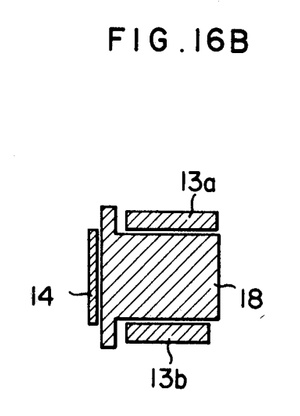

In the embodiment of FIG. 16, one of the heat generating means provided on the upper and lower sides of the rearward extension 18 of the heater body 11, namely heat generating means 13a, is constructed to have an increased coil density at the portion adjacent to the arrival end of the heater body, while the other heat generating means 13b is constructed to have an increased coil density at the portion adjacent to the departure end of the heater body. The heat generating means 13a is controlled to have a sharp power-temperature characteristic by a temperature sensor 15a ($R_1$ in FIG. 6) provided at the arrival end of the heater body 11, and the other heat generating means 15b is controlled to have a gentle power temperature characteristic by a temperature sensor 15b ($R_2$ in FIG. 6) provided at the departure end of the heater body 11.

Figure 17A:
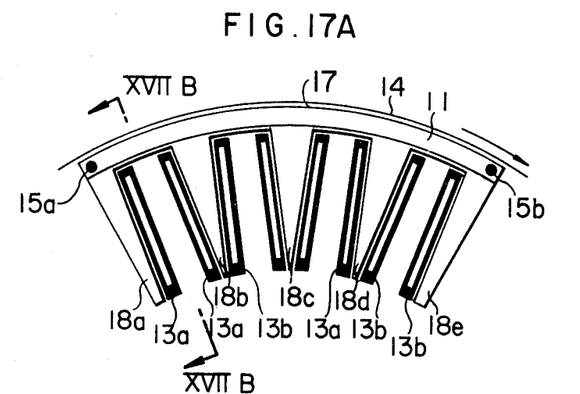
FIGS. 17A and 17B show, in plan view and transversal section, a still further embodiment of the invention.
Figure 17B:
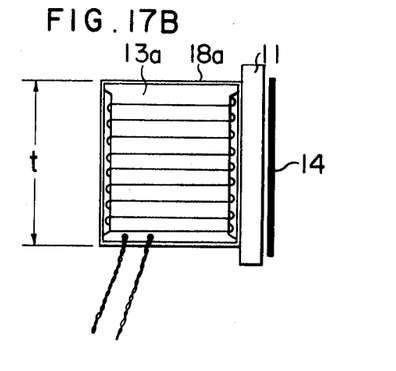

FIG. 17 shows a further embodiment of the invention. In this embodiment, the heater body 11 has a comb-like configuration with a plurality of backward extensions 18a to 18e extending radially inwardly with respect to the arcular heating surface 17 and having a transverse dimension $t$ slightly smaller than the width of the magnetic tape 14. A heat generating means 13a is provided on the inner side of the extension 18a located at the arrival end of the heater body 11, a heat generating means 13b is provided on the inner side of the extension 18e located at the departure end of the heater body 11, and other heat generating means 13a and 13b are provided on opposite sides of each of the intermediate extensions 18b to 18d. The heat generating means 13a are controlled to have a sharp power-temperature characteristic by a temperature sensor 15a provided at the arrival end, and the other heat generating means 13b are controlled to have a gentle power-temperature characteristic by a temperature sensor 15b provided at the departure end.

This construction permits uniform heating of tape over the width thereof, and it is particularly effective for heating wide tapes.

What we claim is:

1. A tape heater comprising:
   a tape drive means for driving a magnetic tape to be heated at a predetermined speed;
   a heater body having a heating surface to be touched by the travelling magnetic tape;
   at least first and second electric heater means thermally coupled to said heater body, said first and second electric heater means being disposed symmetrically with respect to the longitudinal center line of the magnetic tape proceeding in contact with said heating surface;
   at least first and second power supply means respectively connecting said first and second electric heater means to a power source;
   temperature detecting means for detecting the temperature of said heater body; and
   at least first and second power supply control means for controlling the power supply to said first and second electric heater means, said first and second power supply control means being respectively provided in said first and second power supply means;
   said first and second power supply control means having respective different power-temperature characteristics.

2. A tape heater according to claim 1, wherein said electric heater means are provided on at least one projection of the heater body projecting rearwardly with respect to the front heating surface.

3. A tape heater according to claim 2, wherein said projection extends at right angles to said heating surface and in a direction parallel to the direction of travel of the tape and has a thickness smaller than the tape width.

4. A tape heater according to claim 2, wherein a plurality of said projections are provided.

5. A tape heater according to claim 2, wherein a plurality of said projections are provided, the distance between adjacent projections increasing as one departs backwardly from the back of the heating surface.

6. A tape heater according to claim 1, wherein said temperature detecting means consists of a plurality of temperature detectors at least including a first detector provided at or near the tape arrival end of said heater body and a second detector provided at or near the tape departure end of said heater body, said first detector constructed to control said first power supply control means having a sharp power-temperature characteristic, said second detector constructed to control said second power supply control means having a gentle power-temperature characteristic.

7. A tape heater according to claim 1, wherein said temperature detecting means is disposed such that the length of the heat transfer path from said electric heater means to said detecting means is greater than the length of the heat transfer path from said electric heater means to said heating surface.

8. A tape heater according to claim 1, wherein said first and second electric heater means are arranged closely side by side with respect to the direction of tape progress, and also wherein said temperature detecting means consists of a plurality of temperature detectors, one of said detectors being provided at or near the tape arrival end of said heater body for controlling the first power supply control such that the first electric heater means provided on the tape arrival side of the heater body has a sharp power-temperature characteristic, another detector being provided at or near the tape departure end of said heater body for controlling the second power supply control means such that the second electric heater means provided on the tape departure side of the heater body has a gentle power-temperature characteristic.

9. A tape heater according to claim 1, wherein said first and second electric heater means are provided in contact with opposite sides of a projection of the heater body extending parallel to the direction of tape progress, said first heat generating means having an increased coil density portion adjacent to the tape arrival end of the heater body, said second heat generating means having an increased coil density portion adjacent to the tape departure end of the heater body, and also wherein said temperature detecting means includes a first temperature detector and a second temperature detector, said first temperature detector being provided at or near the tape arrival end of the heater body for controlling the power supply control means such that said first heat generating means has a sharp power-temperature characteristic, said second temperature detector being provided at or near the tape departure end of the heater body for controlling the power supply control means such that said second heat generating means has a gentle power-temperature characteristic.

10. A tape heater according to claim 1, wherein said heater body has a plurality of projections projecting in a comb-like form backwardly with respect to said heating surface and each having a width substantially equal to the tape width, said electric heater means being provided in contact with opposite sides of said individual projections except for the outer side of the opposite end projections, and also wherein said temperature detecting means includes a first temperature detector and a second temperature detector, said first temperature detector being provided at or near the tape arrival end of the heater body for controlling the electric heater means provided on the tape arrival side of the projections to have a sharp power-temperature characteristic, said second temperature detector being provided at or near the tape departure end of the heater body for controlling the electric heater means provided on the tape departure side of the projections to have a gentle power-temperature characteristic.

* * * * *